United States Patent [19]

Wehner

[11] Patent Number: 4,527,161
[45] Date of Patent: Jul. 2, 1985

[54] 3D IMAGING WITH STEPPED FREQUENCY WAVEFORMS AND MONOPULSE PROCESSING

[75] Inventor: Donald R. Wehner, San Diego, Calif.

[73] Assignee: The United States of America as represented by the Secretary of the Navy, Washington, D.C.

[21] Appl. No.: 300,344

[22] Filed: Sep. 8, 1981

[51] Int. Cl.$^3$ .................... G01S 13/44; G01S 13/89
[52] U.S. Cl. ................................ 343/16 M; 343/17
[58] Field of Search ............ 343/5 CM, 5 FT, 16 M, 343/7.9, 17, 17.2 R; 328/17

[56] References Cited

U.S. PATENT DOCUMENTS

| 3,333,263 | 7/1967 | Kazakevicius et al. | 343/7.9 |
| 3,701,027 | 10/1972 | Belton, Jr. | 343/17 |
| 3,713,155 | 1/1973 | Jaffe | 343/16 M |
| 3,718,927 | 2/1973 | Howard et al. | 343/7.4 |
| 3,778,821 | 12/1973 | Young | 343/5 R |
| 3,778,829 | 12/1973 | Longuemare, Jr. et al. | 343/16 M |
| 3,794,998 | 2/1974 | Pearson, Jr. et al. | 343/16 M |
| 3,860,929 | 1/1975 | Crain | 343/113 R |
| 3,887,917 | 6/1975 | Howard et al. | 343/7.9 |
| 3,889,261 | 6/1975 | Sirven | 343/14 |
| 4,068,234 | 1/1978 | O'Meara | 343/17 |
| 4,095,223 | 6/1978 | Howard | 343/7.9 |
| 4,110,754 | 8/1978 | Endo | 343/16 R |
| 4,213,130 | 7/1980 | Vaessen | 343/16 M |
| 4,339,752 | 7/1982 | Williams et al. | 343/5 CM |
| 4,346,382 | 8/1982 | Rose et al. | 343/5 SA |
| 4,379,295 | 4/1983 | Lewis et al. | 343/5 FT |
| 4,387,373 | 6/1983 | Longuemare, Jr. | 343/16 M |

OTHER PUBLICATIONS

Merrill J. Skolnik, "Introduction for Radar Systems" 2nd Ed. 1980, p. 421, McGraw-Hill Book Co.

Primary Examiner—T. H. Tubbesing
Assistant Examiner—Gilberto Barrón, Jr.
Attorney, Agent, or Firm—Robert F. Beers; Ervin F. Johnston; Harvey Fendelman

[57] ABSTRACT

A radar is disclosed that obtains three-dimensional radar images of targets for target identification at tactically useful ranges. Images are generated with the radar in a target angle and range tracking mode. The image is a plot, display or recording of position of target scatterers in range and two orthogonal cross-range dimensions. Range resolution is obtained by generating synthetic range profiles from the monopulse sum channel echo voltages which results from transmitting a stepped frequency waveform. Cross-range resolution is obtained by similarly processing differential cross-range error voltages of the echoes seen at the output of two orthogonal channels of a wideband monopulse receiver.

4 Claims, 17 Drawing Figures

(a) OUTPUTS FROM FEEDS 1 AND 2
(b) SUM AND DIFFERENCE CHANNEL COMPARATOR OUTPUTS
(c) QUADRATURE DETECTOR OUTPUT (a) COMPLEX VALUES FOR RANGE PROFILE OF SINGEL SCATTERER −d FROM BORESITE (b) COMPLEX VALUES FOR RANGE PROFILE OF SINGEL SCATTERER +d FROM BORESITE (c) BIPOLAR MAGNITUDES FOLLOWING DIGITAL PHASE COMPARISON FOR ±d

*FIG. 9*

3D IMAGING WITH STEPPED FREQUENCY WAVEFORMS AND MONOPULSE PROCESSING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

It has been shown in the past that two-dimensional radar dimensional radar images of ship and air targets can be obtained by using a process referred to as inverse synthetic aperture radar (ISAR). In this two-dimensional technique the target of interest is observed with a radar capable of resolving the target in both slant-range and cross-range. Slant-range is extracted by processing wideband stepped-frequency or pulse-compression waveforms. Cross-range is extracted by processing the fine-structure differential Doppler produced by target aspect motion. By employing a stepped-frequency waveform applicable to a wide range of radars, the slant-range resolution is limited only by the radar's electronically tunable bandwidth.

From the standpoint of image interpretation, however, the following inherent shortcomings remain in the ISAR technique:

1. The cross-range dimension scale is a direct function of the target's aspect rotation rate. The result is distorted images unless the rotation rate can be determined from auxiliary target track filed data.

2. The image plane is unknown since the radar cannot determine the direction of the target's rotation vector producing the differential Doppler.

3. The required image frame time to produce a given cross-range resolution is dependent on a target's aspect rotation rate relative to the radar. Therefore, a long-range, nonmaneuvering air target may require tens of seconds to image.

These three problems with the ISAR technique result from its inherent dependence upon target changing its aspect to the radar. The magnitude and direction of the target's aspect rotation vector are not determined in the ISAR approach except by auxiliary data, and the magnitude may be too small.

SUMMARY OF THE INVENTION

The three-dimensional radar imaging technique of the present invention overcomes all three of the above cited problems by generating images from monopulse sum and different signals independent of the target's aspect motion.

The three-dimensional imaging technique of the present invention resolves the target in two orthogonal cross-range dimensions as well as in slant-range from the differential error signals in the azimuth and elevation channels of an amplitude comparison monopulse radar. (The invention can also be implemented with a phase sensitive monopulse radar.) The bandwith of the radar corresponds to that required for the desired slant-range resolution. Stepped-frequency waveforms are used to resolve targets in range. The monopulse processing is used to extract two orthogonal components of cross-range resolution in each resolved target range cell. Use of stepped-frequency waveforms provides pulse-to-pulse coherent integration. This makes it possible to extract cross-range distances between target scatterers from the relatively weak angle sensitive (error) signals in the difference channels of the monopulse receiver at useful target ranges.

Three channels are required for the 3D monopulse processing: a sum channel and two difference channels. In accordance with the present invention the frequency of the radar transmitted pulse is changed pulse to pulse over a burst of frequencies $f_i = 0$ to $f_n$. The frequency of a local oscillator reference to the first mixer at the front end of the radar receiver is also changed identically pulse-to-pulse but offset by a fixed intermediate frequency so that fixed narrowband intermediate frequency signals are produced in each of the three channels. A quadrature mixer then mixes the three intermediate frequency signals with a coherent reference from the frequency synthesizer to produce homodyne outputs. These outputs are sampled and digitized and then processed into outputs suitable for 1D, 2D or 3D displays.

In accordance with the present invention two alternative types of processing are disclosed. In the first embodiment, single bursts of n frequencies are processed to form either 1D profiles or 3D images. Stepped frequency sum-channel signals and error signals from the two difference channels are first velocity corrected. Each burst of n echo signals from the three channels is then Fourier transformed into range profiles: sum signals into slant-range profiles and error signals into profiles of error signal versus range. Error signals in both channels are then, range bin by range bin, normalized by the sum signal to produce bipolar cross-range magnitudes ready to be displayed.

Processing involved in the above described first embodiment of the present invention will theoretically result in false cross-range position in a slant-range bin when two or more approximately equal scatterers are unresolved. The error signal in that slant-range bin will be that produced by the phase center of both (or all) scatterers in the bin and will not, in general, correspond to any single scatterer. In accordance with the present invention, this problem can be corrected and improved range performance can be achieved by coherent processing of multiple stepped-frequency bursts. In this embodiment, an additional Fourier transform is carried out to separate scatterers in Doppler as well as in slant-range and cross-range. The Doppler is that produced as in ISAR by target aspect rotation relative to the radar.

OBJECTS OF THE INVENTION

Accordingly, it is the primary object of the present invention to disclose a novel radar system for generating signals suitable for 3D display radar images of targets.

It is a further object of the present invention to disclose a radar system for generating target images at operationally useful radar ranges, rapidly and without image plane or scale ambiguity.

It is a further object of the present invention to disclose a radar system for 3D displays of radar targets that may be implemented with relatively minor modifications to existing radars.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
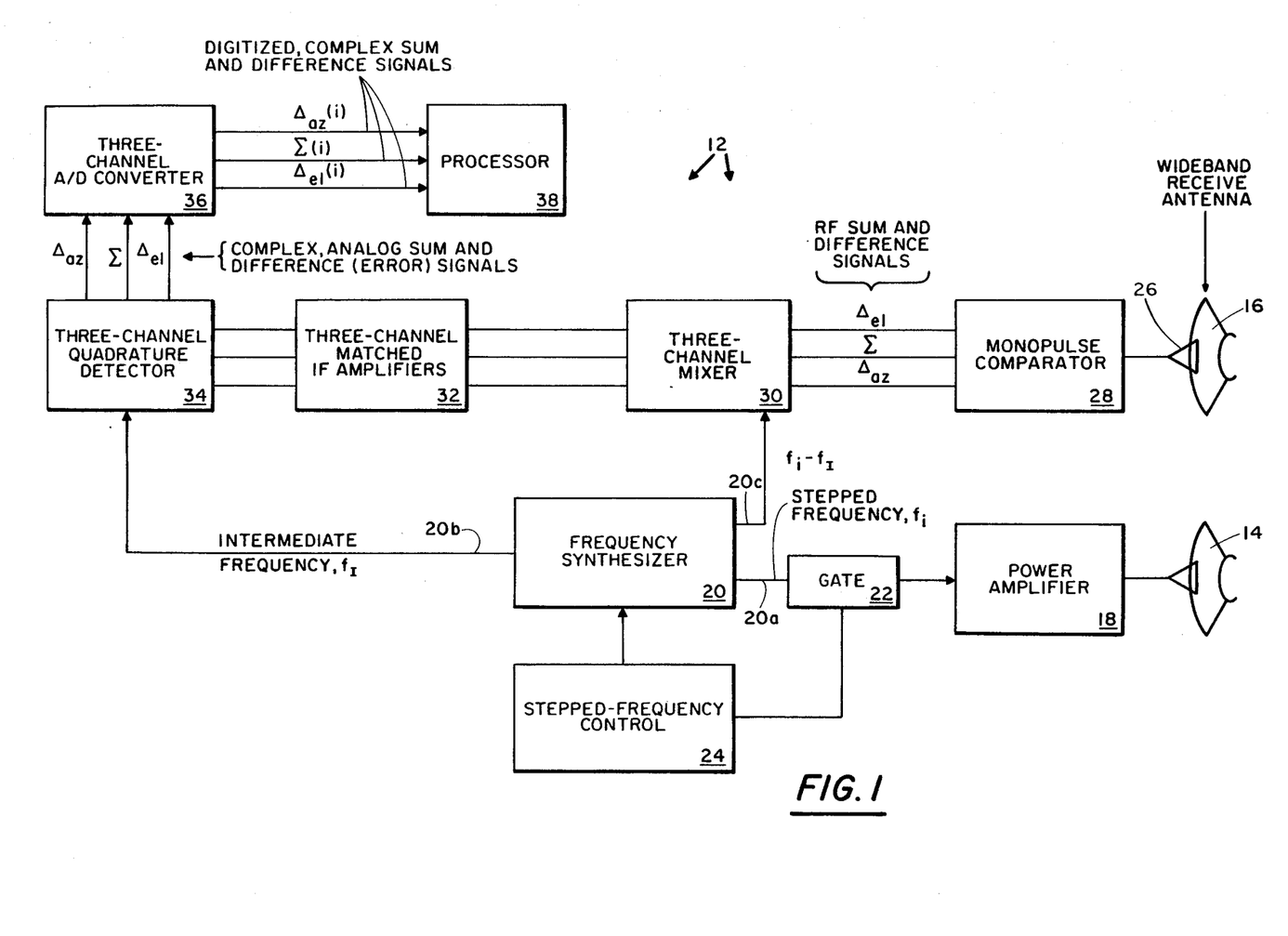
FIG. 1 is a schematic block diagram of the radar system of the present invention.
Figure 2:
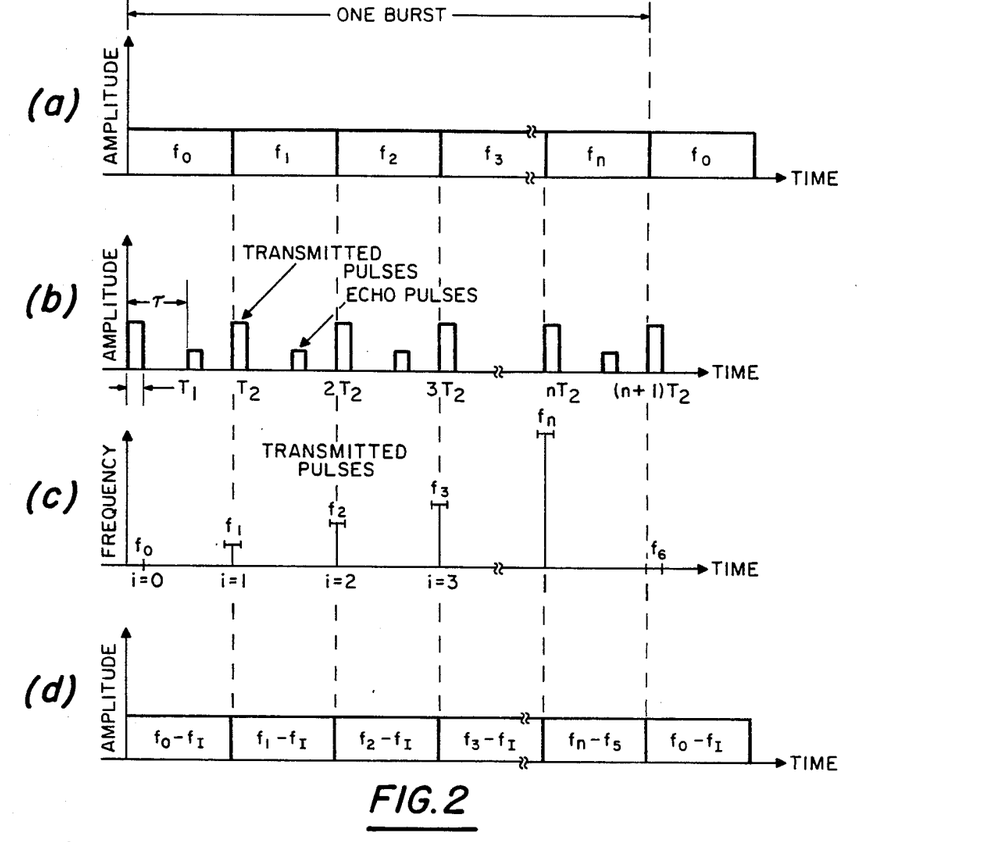
FIGS. 2a through 2d are graphical representations of signals generated by the present invention.

Referring now to FIG. 1 there is illustrated the 3D imaging monopulse radar system 12 of the present invention. The 3D imaging radar 12 is comprised of a wideband radar transmit antenna 14 and a wideband radar receiver antenna 16. It is to be understood at this point that although separate transmit and receive antennas are illustrated and described, a single transmitting-receiving antenna with a duplexer may be used instead as would be readily understood by those skilled in the art. Transmit antenna 14 receives the transmit signal via power amplifier 18 which amplifies the signal generated by frequency synthesizer 20. Frequency synthesizer 20 produces on output terminal 20a one or more series of bursts, each burst being comprised of a series of n stepped frequency signals. The output signal 20a from frequency synthesizer 20 is shown in FIG. 2a. This signal is gated by gate network 22 such that only a portion of each signal is transmitted via power amplifier 18 and antenna 14 as is illustrated in FIG. 2b. The resulting series of n stepped frequency pulses, denoted as $f_i$, is illustrated schematically in FIG. 2b in terms of amplitude versus time for one burst and in FIG. 2c in terms of frequency versus time. It is also noted at this point that, although the transmitted pulses as depicted in FIG. 2c are illustrated as increasing sequentially in frequency as a matter of time, the n pulses, $f_i$, of each burst, may be varied from pulse to pulse in frequency by any other sequence of different frequencies so long as the amplitude of each pulse is the same. The frequency hopping of frequency synthesizer 20 is accomplished by means of stepped frequency control network 24 as is well known. Frequency synthesizer 20 also produces an output on output terminal 20b that is a fixed intermediate frequency reference signal $f_I$. The third output produced on output terminal 20c of frequency synthesizer 20 is produced by mixing the frequency signal $f_i$ with the frequency signal $f_I$ to produce the signals $f_i$-$f_I$ as should be apparent to those of ordinary skill in this art. The signals produced on output terminal 20c are illustrated schematically in FIG. 2d.

Figure 3:
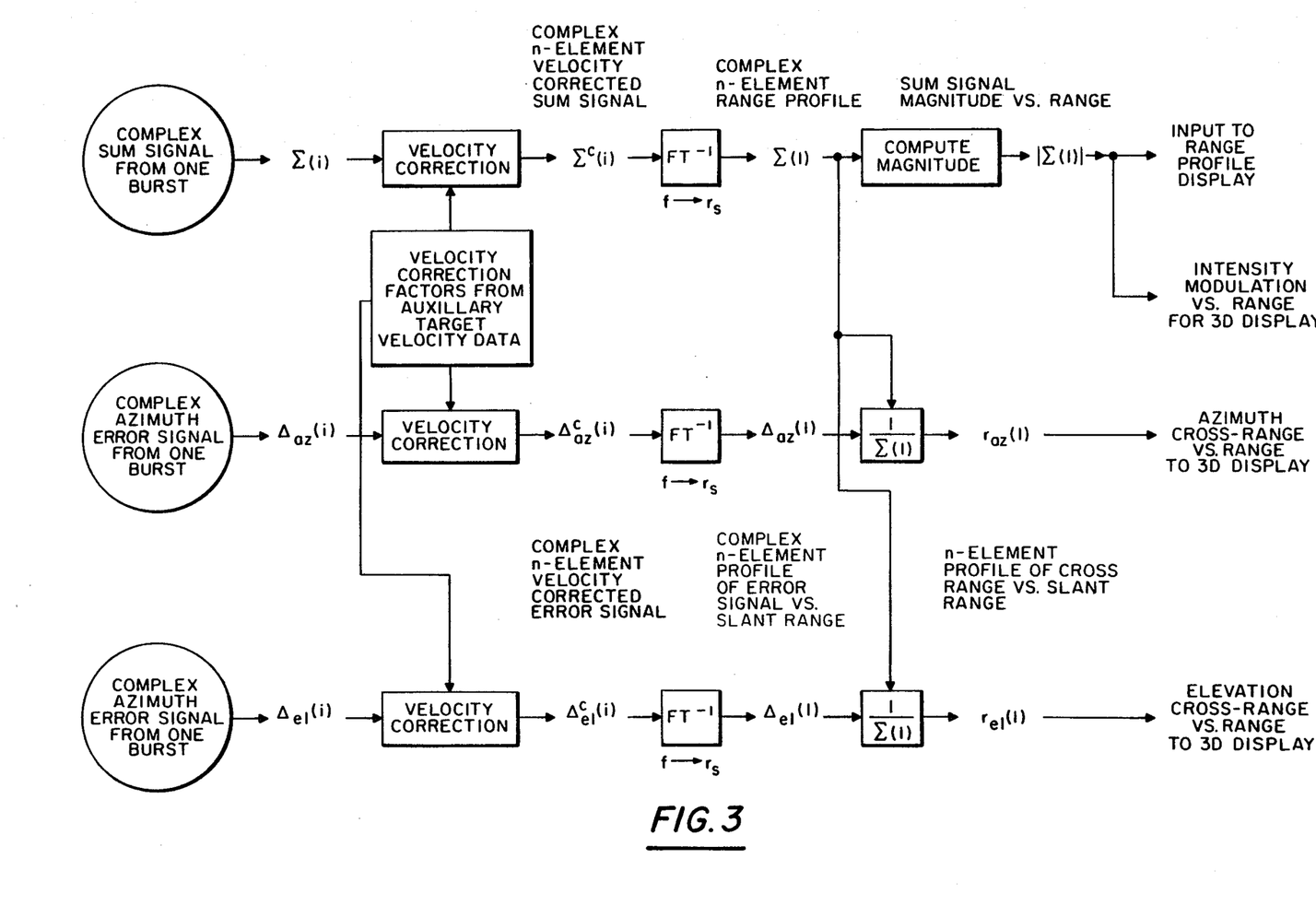
FIG. 3 is a block diagram representation of the signal processing performed in accordance with a first embodiment of the present invention.
Figure 4A:
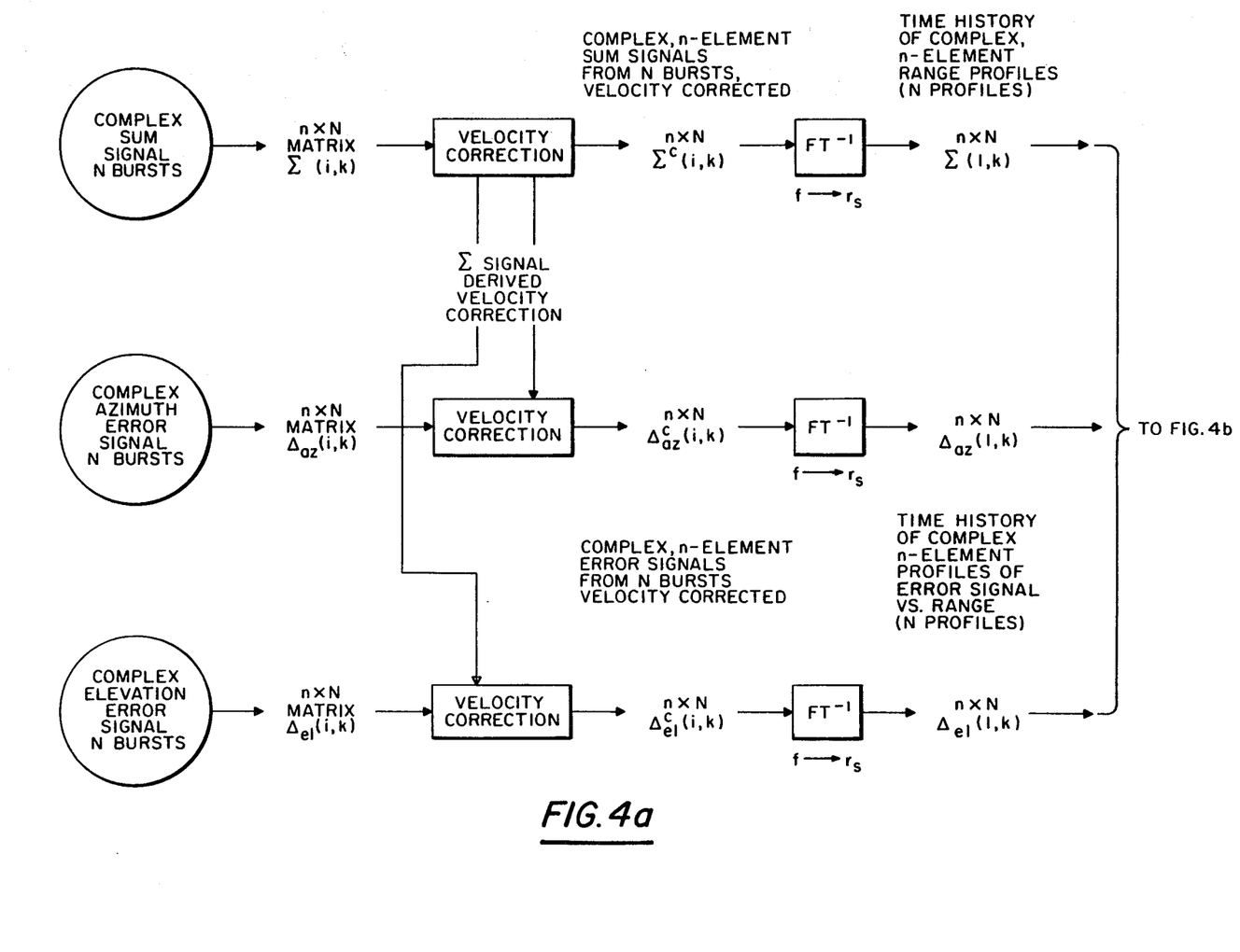
FIGS. 4a and 4b are a block diagram representation of the signal processing performed in accordance with a second embodiment of the present invention.
Figure 4B:
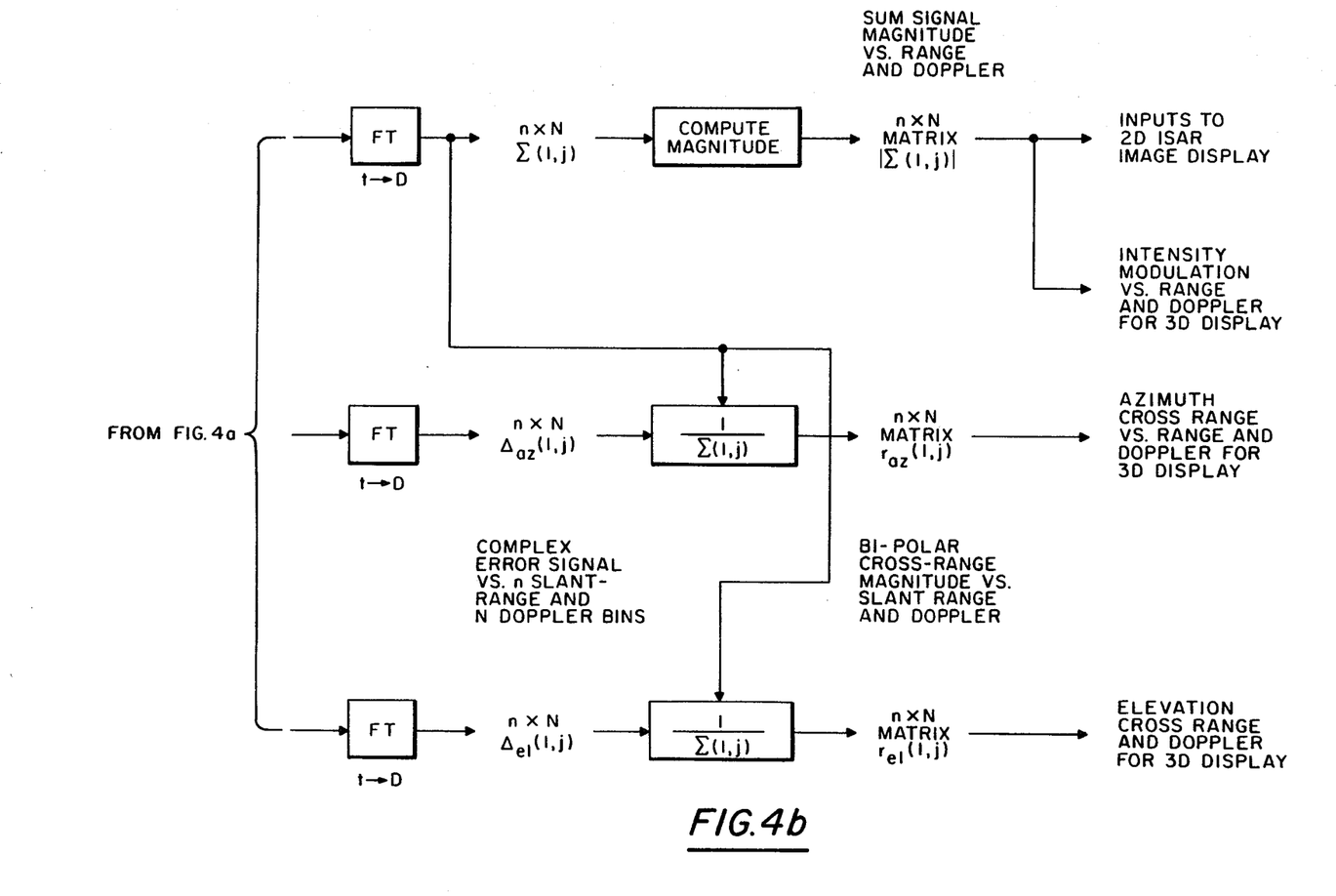
Figure 5:
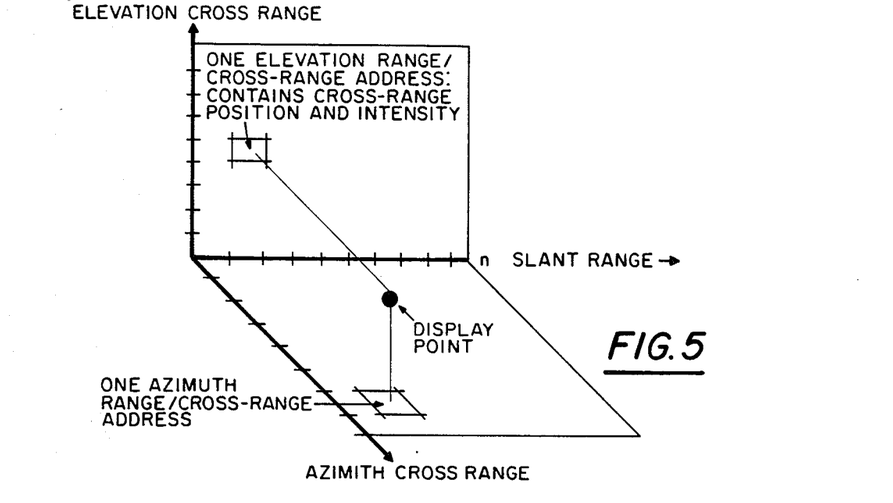
FIG. 5 is a graphical representation of one frame of 3D image data developed in accordance with a first embodiment of the present invention.

The radar echo signals received by wideband receive antenna 16 are transmitted via the four horn monopulse feed 26 to the monopulse comparator 28. The microwave monopulse comparator 28 produces a sum channel signal $\Sigma$ and two difference channels signals $\Delta$ (also called error signals) by adding and substracting, respectively, the pair of signals appearing at the output of the four horn monopulse feed which are related to the azimuth of the target and also by adding and substracting, respectively the pair of signals appearing at the output of the monopulse feed 26 that are related to the elevation of the target. Three channel mixer 30 receives the output from monopulse comparator 28 and mixes it with the signal $f_i$-$f_I$ appearing on output terminal 20c of frequency synthesizer 20. The outputs of three channel mixer 30 are amplified by the three channel, insertion delay matched IF amplifier network 32. The amplified sum and difference channel mixer outputs are furnished to the three channel quadrature detector 34 which produces homodyne sum and difference outputs by mixing the outputs of ampifier 32 with the intermediate frequency signal $f_I$ appearing on output terminal 20b of frequency synthesizer 20. Three channel A/D converter 36 samples the homodyne outputs of the quadrature detector 34 and quantizes these signals into complex digital data samples, one complex number for each channel for each radar pulse. This quantized, digital data is ultimately furnished to processor 38 which may be a general purpose digital computer or a dedicated type processor. The processor 38 performs one of two alternative types of processing as illustrated in FIGS. 3, 4a and 4b, respectively. As illustrated in FIG. 3, single bursts of n frequencies are processed to form either 1D profiles or 3D images. The stepped frequency sum channel data samples and error signal data samples from the two difference channels are first velocity corrected. Each burst of n echo samples from the three channels is then Fourier transformed into range profiles: sum signal samples into slant-range profiles and error signal samples into profiles of error signal versus range. The error signals in both difference channels are then, range bin by range bin normalized by the corresponding sum signal in the same range bin to produce bipolar cross-range magnitudes ready to be displayed. A 3D display format is illustrated in FIG. 5. The cross-range position of a resolved scatterer in each slant-range bin is plotted, as indicated, from its measured azimuth and elevation cross-range position. The 3D image can be displayed isometrically on a conventional 2D display by conventional processing techniques.

Figure 6:
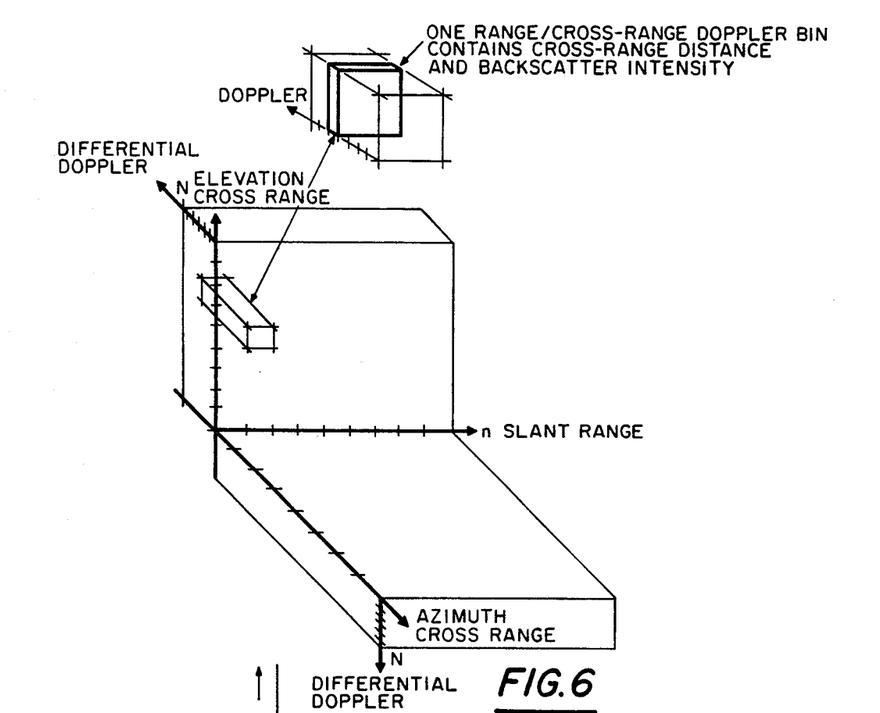
FIG. 6 is a graphical representation of one frame of 3D image data developed in accordance with a second embodiment of the present invention.

The processing illustrated in FIG. 3 will theoretically result in a false cross-range position in a slant-range bin when two or more approximately equal scatterers are unresolved. The error signal in that slant range bin will be that produced by the phase center of both scatterers in the bin and will not, in general, correspond to any single scatterer. This problem can be corrected and improved range performance can be achieved by coherent processing of multiple stepped-frequency bursts as shown in FIGS. 4a and 4b. In FIGS. 4a and 4b an additional Fourier transform is carried out to separate scatterers in Doppler as well as in slant-range and cross-range. The Doppler is that produced as in ISAR by target aspect rotation relative to the radar. Display processing of one frame of a 3D image is illustrated in FIG. 6. Multiple Doppler bins are seen to exist for each slant-range bin. Therefore, if multiple scatterers exists in a single range bin, they may be separable in terms of Doppler and therefore be displayed separately. Tables 1 and 2 below define the terms used in FIGS. 3, 4a and 4b, respectively.

TABLE 1

Symbols used in FIG. 3. (All signals are digital complex numbers unless otherwise noted.)

| | |
|---|---|
| $\Sigma_i$ (i) | Sum signal echo from frequency step i. |
| $\Sigma_i^c$ (i) | Velocity-corrected sum signal. |
| $\Delta_{az}$ (i) | Azimuth error signal from frequency i. |
| $\Delta_{az}^c$ (i) | Velocity-corrected elevation error signal. |
| $\Delta_{el}$ (i) | Elevation error signal from frequency i. |
| $\Delta_{el}^c$ (i) | Velocity-corrected elevation error signal. |
| $FT^{-1}$ | Discrete inverse Fourier transform. |
| f→$r_s$ | Transform from echo spectrum to slant-range profile. |
| $\Sigma$ (l) | n-element slant-range profile in sum channel. |
| $\Delta_{az}$ (l) | n-element azimuth error signal vs. slant range. |
| $\Delta_{el}$ (l) | n-element elevation error signal vs. slant range. |
| $r_{az}$ (l) | n-element azimuth cross range vs. slant range (bipolar magnitude) |
| $r_{el}$ (l) | n-element elevation cross range vs. slant range (bipolar magnitude). |
| $\|\Sigma$ (l)$\|$ | n-element slant-range profile in sum channel (magntide). |

TABLE 2

Symbols used in FIGS. 4a and 4b.

| | |
|---|---|
| $\Sigma$ (i,k) | Sum signal echo from frequency step i, burst k. |
| $\Sigma^c$ (i,k) | Velocity-corrected sum signal. |
| $\Delta_{az}$ (i,k) | Azimuth error signal from frequency step i, burst k. |
| $\Delta_{az}^c$ (i,k) | Velocity-corrected azimuth error signal. |
| $\Delta_{el}$ (i,k) | Elevation error signal from frequency step i, burst k. |
| $\Delta_{el}^c$ (i,k) | Velocity-corrected elevation error signal. |
| f→$r_s$ | Transform from echo spectrum to slant-range profile, burst by burst. |
| t→D | Transform from time history to Doppler frequency, slant-range bin by bin. |
| $\Sigma$ (l,k) | n-element slant-range profile from burst k. |
| $\Delta_{az}$ (l,k) | n-element profile of azimuth error signal vs. slant range from burst k. |
| $\Delta_{el}$ (l,k) | n-element profile of elevation error signal vs. slant range from burst k. |
| $\Sigma$ (l,j) | Sum signal vs. n slant-range and N Doppler bins. |
| $\Delta_{az}$ (l,j) | Azimuth error signal vs. n slant-range and N Doppler bins. |
| $\Delta_{el}$ (l,j) | Elevation error signal vs. n slant-range and N Doppler bins. |
| $r_{az}$ (l,j) | Azimuth cross-range vs. n slant-range and N Doppler bins (bipolar magnitude). |
| $r_{el}$ (l,j) | Elevation cross-range vs. n slant-range and N Doppler bins (bipolar magnitude). |
| $\|\Sigma$ (l,j)$\|$ | Sum signal (magnitude) vs. n slant-range and N cross-range bins. |

Figure 7:
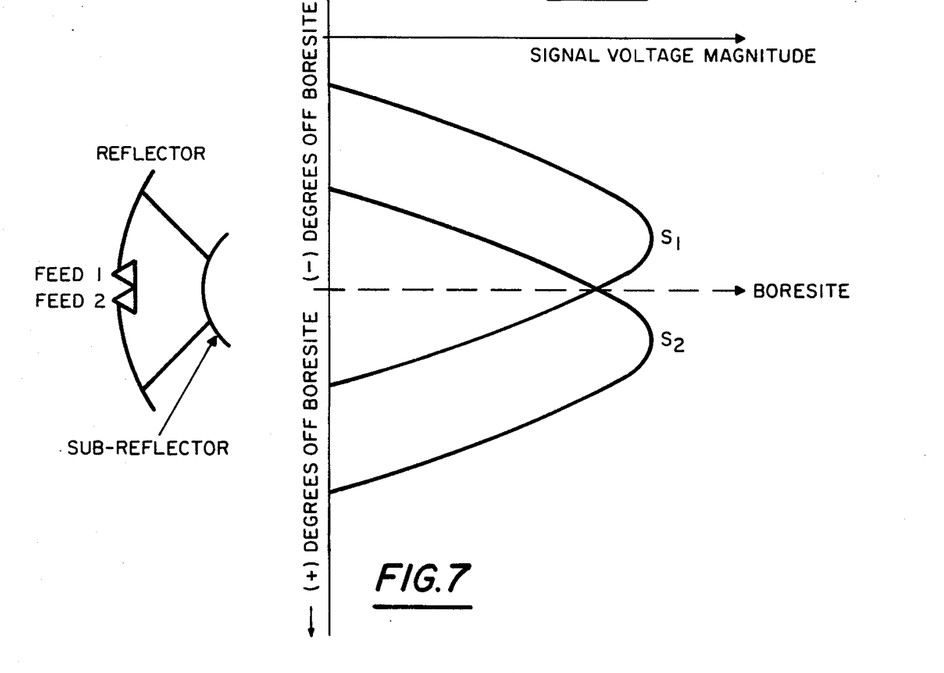
FIG. 7 is a graphical representation of a monopulse antenna output from one pair of feeds feeding a single reflector.
Figure 8:
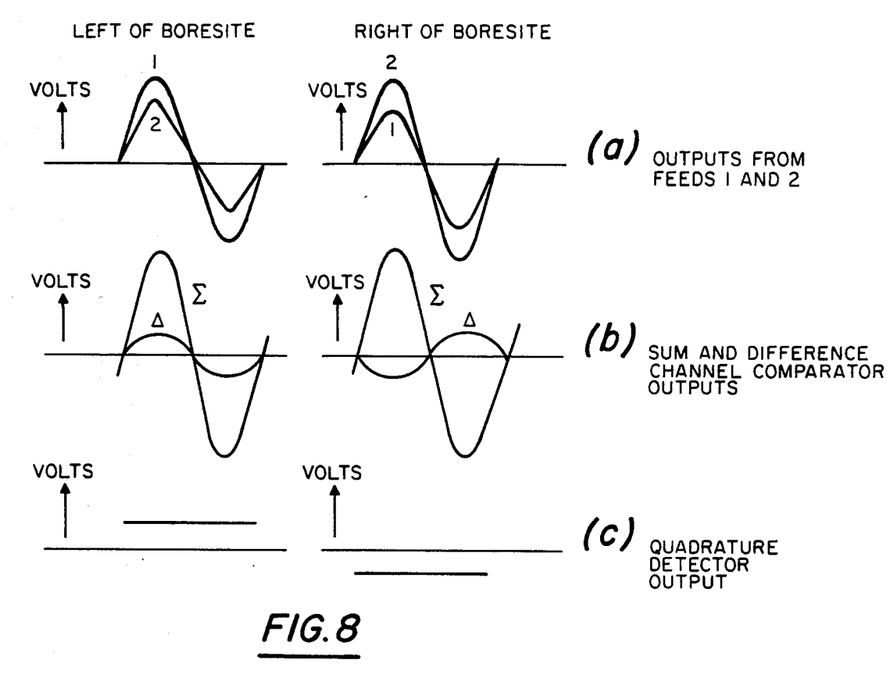
FIGS. 8(a) through 8(c) are graphical representations of monopulse radar echo waveforms for scatterers to the left and right of boresight.

Detailed operation of the stepped frequency 3D image processor 12 will now be discussed from the viewpoint of an image produced from echoes from a single scatterer illuminated by a single burst of n pulses stepped in frequency from f(1) to f(n). The waveform is shown in FIG. 2b. The echo signal levels out of either the azimuth or elevation pair of monopulse antenna feeds 26 are shown in FIG. 7. Off boresite the signals will be unbalanced, as illustrated in FIG. 8(a). The cross-range distance of scatterers from boresite is measured by the amount of unbalance. The direction, left or right in azimuth and up or down in elevation, is indicated by the difference channel error signal phase, 0 or π. See FIG. 8b. The synthesizer 20 of FIG. 1 generates the series of stepped-frequency transmitted pulses of FIG. 2b, a stepped-frequency local oscillator reference signal $f_i$-$f_I$ and a fixed intermediate frequency reference signal $f_I$. All three signals are generated by multiplying up from a fixed master oscillator and are therefore all coherently related. The echo signal received from a target at delay τ (including receiver fixed delay) out of the pair of monopulse antennas from a transmitted pulse at frequency f(i) at frequency step i is $$S_1(i) = \bar{S}_1(i)\exp\{+j2\pi f(i)[t - \tau]\}$$

$$S_2(i) = \bar{S}_2(i)\exp\{+j2\pi f(i)[t - \tau]\}.$$

where $\bar{S}_1(i)$ and $\bar{S}_2(i)$ are echo magnitudes from antenna feeds 1 and 2, respectively. The output of the microwave comparator produces a sum channel signal $\Sigma$ and two difference channel signals $\Delta$ by adding and subtracting, respectively, the signals $S_1(i)$ and $S_2(i)$. The sum channel comparator 28 output becomes $$\Sigma_c(i) = S_1(i) + S_2(i) = [\bar{S}_1(i) + \bar{S}_2(i)]\exp\{+j2\pi f(i)[t - \tau]\}$$
$$= \bar{\Sigma}_c(i)\exp\{+j2\pi f(i)[t - \tau]\}$$

where $\Sigma_c(i)$ is the sum signal magnitude from the comparator 28. The difference channel comparator 28 output becomes $$\Delta_c(i) = S_1(i) - S_2(i) = [\bar{S}_1(i) - \bar{S}_2(i)]\exp\{+j2\pi f(i)[t - \tau]\}$$
$$= \bar{\Delta}_c(i)\exp\{+j2\pi f(i)[t - \tau]\}.$$

where $\Delta_c(i)$ is the error signal magnitude from the comparator 28.

As illustrated in FIG. 8(b), $\Delta_c(i)$ can be either in phase or π radians out of phase with the sum signal. The polarity change of 0 to π occurs at boresite where the error signal is zero. The local oscillator output 20b is set to produce a fixed intermediate frequeney $f_I$=f(i)−f$_L$(i). The local oscillator signal from the synthesizer 20 is $$L(i) = \bar{L}(i)\exp\{+j[2\pi f_L(i)t + \phi_L(i)]\},$$

where $\phi_L(i)$ is the fixed phase, at frequency step i, between the transmitted signal and the local oscillator signal. $\bar{L}(i)$ is the local oscillator magnitude at frequency step i. The sum and difference channel mixer 30 outputs in the lower sideband are:

$$\Sigma_M(i) = M(i)\Sigma_c(i)L(i)$$
$$= M(i)\bar{\Sigma}_c(i)\bar{L}(i)\exp\{+j[2\pi f(i)t - 2\pi f(i)\tau - 2\pi f_L(i)t - \phi_L(i)]\}$$
$$= \bar{\Sigma}_M(i)\exp\{+j[2\pi f_I t - 2\pi f(i)\tau - \phi_L(i)]\}$$

and $$\Delta_M(i) = M(i)\Delta_c(i)L(i)$$
$$= M(i)\bar{\Delta}_c(i)\bar{L}(i)\exp\{+j[2\pi f(i)t - 2\pi f(i)\tau - 2\pi f_L(i)t - \phi_L(i)]\}$$
$$= \bar{\Delta}_M(i)\exp\{+j[2\pi f_I t - 2\pi f(i)\tau - \phi_L(i)]\}$$

where M(i) is the mixer 30 conversion loss at frequency step i. The quadrature detector 34 produces homodyne sum and difference outputs by mixing with the fixed intermediate frequency reference on output 20b which can be expressed as $$I(i) = \bar{I}(i)\exp\{+j[2\pi f_I t + \phi_I(i)]\}$$

where $\phi_I(i)$ is the fixed phase between the transmitted and intermediate frequency signals at frequency step i. $\bar{I}(i)$ is the intermediate frequency magnitude at frequency step i. The homodyne sum and difference outputs out of the quadrature detector 34 are $$\Sigma_Q(i) = Q(i)\Sigma_M(i)I(i)$$
$$= Q(i)\overline{\Sigma}_M(i)\overline{I}(i)\exp\{-j[2\pi f(i)\tau + \phi_L(i) + \phi_I(i)]\}$$
$$= \overline{\Sigma}_Q(i)\exp\{-j[2\pi f(i)\tau + \phi_L(i) + \phi_I(i)]\}$$

$$\Delta_Q(i) = Q(i)\Delta_M(i)I(i)$$
$$= \overline{\Delta}_M(i)\exp\{-j[2\pi f(i)\tau + \phi_L(i) + \phi_I(i)]\},$$

where Q(i) is the quadrature detector 34 loss at frequency step i. Phase distortion results when the radar system phase, including $\phi_L(i)$ and $\phi_I(i)$, does not change linearly with frequency. When uncorrected, the result is distortion of the synthetic range profile. For purposes of this analysis, no loss in concept meaning occurs when $\phi_L(i)$ and $\phi_I(i)$ are set to zero; i.e., no distortion. Then $$\Sigma_Q(i) = \overline{\Sigma}_Q(i)\exp[-j2\pi f(i)\tau]$$
$$\Delta_Q(2) = \overline{\Delta}_Q(i)\exp[-j2\pi f(i)\tau].$$

Figure 9:
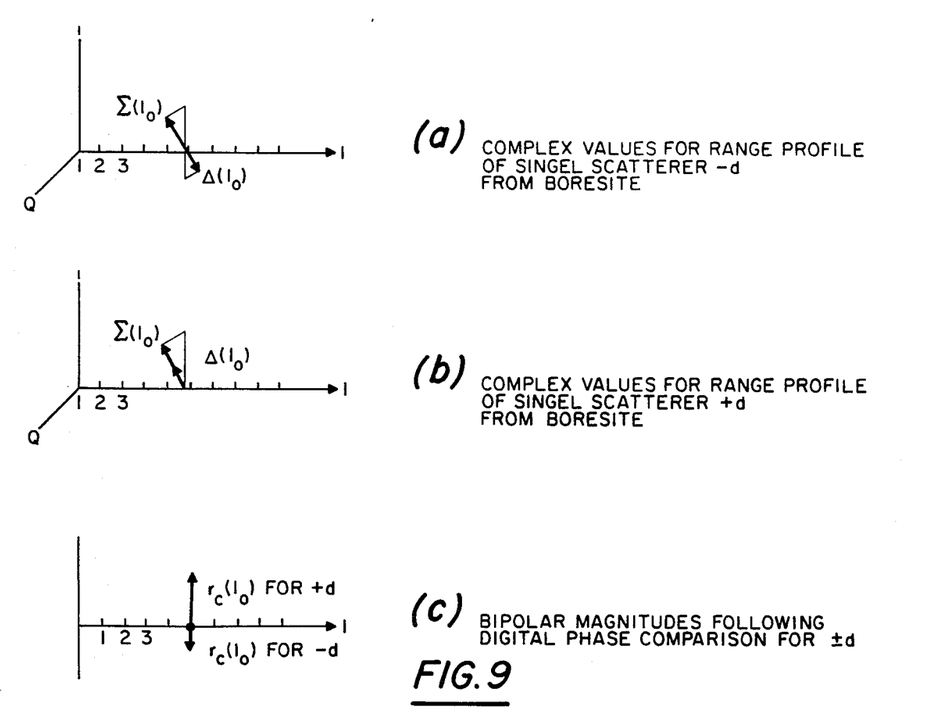
FIGS. 9(a) through 9(c) are graphical representation of sum and difference channel range profiles before and after phase comparison for a single scatterer.

$\Sigma_Q(i)$ and $\Delta_Q(i)$, when evaluated for one burst, $i=1\to n$, are the complex sum and difference channel spectral signatures of the target (single scatterer for this analysis). At this point the signals are sampled and quantized into complex digital data as indicated in FIG. 1, i.e., into the three-channel A/D converter 36 outputs $\Sigma(i)$, $\Delta_{az}(i)$ and $\Delta el(i)$. Sampling occurs at time $t = S(i)$ given by $$S(i) = [i-1]T_2 + \frac{T_1}{2} + \frac{2R}{c},$$

where $T_2$ is the pulse interval, $T_1$ is the pulse width, and 2R/C is the range delay at range R. C is the propagation velocity. If the target has radial motion relative to the radar, then velocity correction is required to compensate for phase distortion produced by target velocity. Velocity correction can be applied in the sampling process before digitizing by using velocity or phase tracking range sampling gates. Velocity correction can also be carried out digitally on data sampled with a fixed range gate. The latter technique is illustrated in FIGS. 3, 4a and 4b. Details of the velocity correction are described below. Velocity correction and all subsequent processing in FIGS. 3, 4a and 4b are carried out digitally. For single-burst 3D imaging, the data need only be corrected to the order of a few knots. For multiple-burst processing, instantaneous velocity correction is required to achieve burst-to-burst phase alignment within a phase error of $\pm\pi/2$. The velocity-corrected signals are denoted $\Sigma^c(i)$, $\Delta_{az}^c(i)$ and $\Delta_{el}^c(i)$. $\Delta^c(i)$ is used to designate both the azimuth and elevation difference channel signals. Thus $$\Sigma^c(i) = \overline{\Sigma}(i)\exp[-j2\pi f(i)\tau]$$
$$\Delta^c(i) = \overline{\Delta}(i)\exp[-j2\pi f(i)\tau],$$

where $\Sigma(i)$ and $\Delta(i)$ are equal or proportional to the presampled magnitudes out of the quadrature detector $\Sigma_Q(i)$ and $\Delta_Q(i)$. The sampled and velocity-corrected sum and difference echo data, $\Sigma(i)$ and $\Delta(i)$, for one burst, $i=1\to n$, are now Fourier transformed into synthetic range profiles according to $$\Sigma(l) = \frac{1}{n}\sum_{i=1}^{n}\Sigma^c(i)\exp\left(+j\frac{2\pi}{n}li\right)$$
$$= \frac{1}{n}\sum_{i=1}^{n}\overline{\Sigma}(i)\exp\left[j\frac{2\pi}{n}li - j2\pi f(i)\tau\right]$$

$$\Delta(l) = \frac{1}{n}\sum_{i=1}^{n}\Delta^c(i)\exp\left(+j\frac{2\pi}{n}li\right)$$
$$= \frac{1}{n}\sum_{i=1}^{n}\overline{\Delta}(i)\exp\left[j\frac{2\pi}{n}li - j2\pi f(i)\tau\right],$$

where l is the range increment, also referred to as "range cell." FIGS. 9a and 9b illustrate $\Sigma(l)$ and $\Delta(l)$ for a single scatterer at range element $l_o$.

Digital phase comparison is next applied to the Fourier-transformed sum and difference channel outputs. Phase comparison is carried out by vector division of the above complex sum and difference range profiles. The result is bipolar amplitudes representing scatterer distance from boresite. An explanation of the process follows in terms of phase comparison between sum and difference range profile responses to a single scatterer. The output of the digital phase comparator is $$r_c(l) = \frac{\Delta(l)}{\Sigma(l)}$$
$$= \frac{\frac{1}{n}\sum_{i=1}^{n}\overline{\Delta}(i)\exp\left[j\frac{2\pi}{n}li - j2\pi f(i)\tau\right]}{\frac{1}{n}\sum_{i=1}^{n}\overline{\Sigma}(i)\exp\left[j\frac{2\pi}{n}li - j2\pi f(i)\tau\right]}.$$

The sum and difference peak responses $\Delta(l)$ and $\Sigma(l)$ for a single scatterer at range delay $\tau$ will occur at some range element $l_o$ in the n-element profile for which $$\left[i\frac{2\pi}{n}li - j2\pi f(i)\tau\right] = j(2\pi i - \phi),$$

where $\phi$ is a constant phase.

The phase comparator output at $l_o$ then becomes $$r_c(l_o) = \frac{\left[\frac{1}{n}\sum_{i=1}^{n}\overline{\Delta}(i)\right]e^{-j\phi}}{\left[\frac{1}{n}\sum_{i=1}^{n}\overline{\Sigma}(i)\right]e^{-j\phi}}.$$

$r_c(l_o)$ is illustrated in FIG. 9c. For the assumption of spherical scatterers of small radius relative to wavelength, the echo amplitudes are identical at all frequencies, so that $$\overline{\Delta}(i) = \overline{\Delta}$$
$$\overline{\Sigma}(i) = \overline{\Sigma}$$

for all i. Then $$r_c(l_o) = \frac{\overline{\Delta}(l_o)}{\overline{\Sigma}(l_o)}.$$

For nonspherical scatterers the echo return vs. frequency will not be quite flat; but for small bandwidth-to-carrier frequencies, the above results are probably not affected significantly. $\Sigma(l_o)$ and $\Delta(l_o)$ are directly related to target scatterer cross section $\sigma$ for a linear receiver, i.e., $$\overline{\Sigma}(l) = D_1\sigma + D_2\sigma = (D_1 + D_2)\sigma$$

and $$\overline{\Delta}(l) = D_1\sigma - D_2\sigma = (D_1 - D_2)\sigma,$$

where $D_1$ and $D_2$ are radar constants at target range delay $\tau$ as seen from antenna feeds 1 and 2, respectively, $\Sigma(l)$ and $\Delta(l)$ will have equal or opposite polarity depending upon which side of boresite the scatterer appears. For scatterers near boresite at distance $\pm d$ from boresite $$D_1 > D_2 \quad \text{for } + d$$

$$D_2 > D_1 \quad \text{for } - d$$

and $$D_1 + D_2 = H_\Sigma$$

and $$D_1 - D_2 = \pm H_\Delta d,$$

where $\pm d$ is the scatter's cross-range distance from boresite, $H_\Sigma$ is the average radar constant referred to the two antennas at a given target range delay $\tau$, and $H_\Delta$ is a constant of proportionality between error signal magnitude and cross-range distance at the same range. The output of the phase comparator for a single scatterer in range element $l_o$ at cross-range distance $\pm d$ from boresite is thus $$r_c(l_o) = \frac{\Delta(l)}{\Sigma(l)}$$

$$= \pm \frac{H_\Delta}{H_\Sigma} d.$$

Right-left or up-down polarity from boresite is given by the $\pm$ sign, and $r_c(l_o)$ is seen to be proportional to off-boresite distance d. The digital phase comparator is seen to extract the right-left polarity for the azimuth difference channel and up-down polarity for the elevation difference channel in the range domain. The comparator also normalizes the difference channel by the sum channel magnitude, so that the error signals from individual scatterers are proportional to their off-boresite distance $\pm d$.

The above analysis applies to processing of a single burst of n frequencies as indicated in FIG. 3. For multiple bursts the processing is as indicated in FIGS. 4a and 4b, the analysis is identical, except that phase comparison to generate cross range vs. range is carried out on multiple bursts. This makes it possible to separate and resolve multiple scatterers in each range element by Doppler processing. Doppler processing is carried out as in 2D ISAR imaging, with a second series of Fourier transforms in time history in each range element. Doppler separation of scatterers occurs for any target aspect change relative to the radar.

Correction for Distortion Produced by Target Velocity

As the radar's stepped frequency bandwidth increases target radial velocity produces significant range profile distortion and burst-to-burst range walk of the range profile. Both effects are nullified in the velocity correction block shown in FIGS. 3, 4a and 4b by correcting the pulse-to-pulse I and Q echo samples before performing the Fourier Transform in each of the three channels. From FIGS. 1 and 2 the homodyne target echo I and Q channel outputs out of each of the three channel quadrature detectors can be defined as $$m(i,k) = \Sigma_Q(i,h) \text{ or } \Delta_Q(i,k)$$
$$= \overline{m}(i,k)\exp[(-j^2\pi f(i,k)\tau]$$
$$= \overline{m}(i,k)\exp[Q(i,k)]$$

where $\overline{m}(i,k)$ is the amplitude and phase, respectively, of the echo for the i-th frequency step of the k-th burst.

The phase angle Q(i,k) is given by $Q(i,k) = -2\pi f_i \tau$ where $\tau$ is the range delay of the sampling pulse measured from the beginning of the transmitter pulse to the center of the received echo pulse. The range delay time $\tau$ is $$\tau = \frac{R - Vt}{c/2} = \frac{2R}{c} - \frac{2Vt}{c}$$

where R is the target range at t=0, V is the target velocity (V>0 for inbound target) and c is the speed of light. See FIG. 2b.

The sampled values are collected at time $$t = S(i,k) \text{ given by}$$

$$S(i,k) = \alpha(i,k) + \frac{T_1}{2} + \frac{2R}{c}$$

where $T_1$ is the pulse width, $T_2$ is the pulse repetition interval, and $\alpha_{ik} = [i-1+n(k-1)]T_2$.

The number of pulses per burst is n. The total number of bursts is N. Upon substitution, the phase $Q_{ik}$ for a point target becomes $$Q(i,k) =$$

$$\frac{4\pi f_i}{c}\left\{V\left[(i-1)T_2 + n(k-1)T_2 + \frac{T_1}{2} + \frac{2R}{c}\right] - R\right\}$$

where the frequency of the transmitted signal is $$f_1 = F + (i-1)\Delta F$$

$$1 \leq i \leq n$$

$$1 \leq k \leq N.$$

In order to generate distortion free images all data from targets with nonzero velocity V must be velocity corrected. This is accomplished by adjusting the I and Q channel response to remove the velocity term in the above expression for Q(i,k). Components of the velocity term, $T_1$, $T_2$ and R are obtained from auxiliary radar inputs and each I and Q sample is corrected to the equivalent of that for a target at zero radial velocity. If auxiliary data is not available, adequate or convenient to apply the effect of target radial velocity is removed by a range profile alignment procedure consisting of continuous cross-correlation of each new synthetic profile(s) to its predecessor(s) using time history averaging followed by smoothed phase correction. It is noted at this point that each target spectral signature is first transformed to its corresponding range profile signature; then the resulting range shift and velocity corrections are made to the original target spectral signatures. The phase correction is obtained by correcting the complex sample from each image bin by the average phase difference over all range bins from each new profile to the previous profile. For single burst imaging the velocity must be corrected to within several knots of zero velocity for surveillance radar frequencies (2-5 GH$_z$). For multiple burst 3D imaging the velocity correction must be made to well within the velocity equivalent of $\pm\pi$ radians of RF phase to avoid serious image distortion, i.e., to within a small fraction of a knot at surveillance radar frequencies.

Obviously, many other modifications and variations of the present invention are possible in the light of the above teachings. It is therefore to be understood that within the scope of the appended claims the invention may be practiced otherwise than as specifically described.

What is claimed is:

1. A radar system comprising:
radar antenna means for transmitting and receiving radar signals and radar echo signals, respectively,
frequency generator means having first, second and third outputs for generating N sets of n stepped frequency pulses each at the frequencies $f_i$ on said first output, for generating a fixed intermediate frequency signal at the frequency $f_I$ on said second output and for generating N sets of n stepped frequency pulses at the frequencies $f_i$-$f_I$ on said third output;
a gate network connected between said frequency generator means first output and said antenna means for gating to said antenna means a selected portion of each of said n pulses of said frequency generator means first output;
a monopulse comparator connected to said antenna means for generating first and second difference signal outputs and a sum signal output;
a three channel mixer having a first input connected to said frequency generator third output and a second input connected to said monopulse comparator first and second signal and sum signal outputs;
an amplifier connected to said three channel mixer;
a three channel quadrature detector connected to said amplifier and to said frequency generator means for producing first and second sets of homodyned difference outputs and a set of homodyned sum outputs;
an A/D converter having an input connected to said three channel quadrature detector sum and difference outputs and having an output; and
a processor connected to said A/D converter output.

2. The radar system of claim 1 wherein N=1.
3. The radar system of claim 1 wherein N>1.
4. The system of claim 1 wherein:
said processor is programmed for velocity correcting said first and second sets of homodyned difference outputs and said set of homodyned sum outputs, for Fourier transforming each of said first and second sets of velocity corrected difference outputs and for Fourier transforming each said set of velocity corrected homodyned sum outputs, and for normalizing each of said first and second sets of Fourier transformed, velocity corrected difference outputs by corresponding ones of said velocity corrected Fourier transformed sum outputs.

* * * * *